(12) United States Patent
Zhang

(10) Patent No.: US 11,226,669 B2
(45) Date of Patent: Jan. 18, 2022

(54) CONTROL METHOD FOR ELECTRONIC DEVICE, ELECTRONIC DEVICE, COMPUTER-READABLE STORAGE MEDIUM

(71) Applicant: GUANGDONG OPPO MOBILE TELECOMMUNICATIONS CORP., LTD., Guangdong (CN)

(72) Inventor: Haiping Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 311 days.

(21) Appl. No.: 16/432,307

(22) Filed: Jun. 5, 2019

(65) Prior Publication Data

US 2019/0377400 A1     Dec. 12, 2019

(30) Foreign Application Priority Data

Jun. 6, 2018   (CN) .......................... 201810573861.7

(51) Int. Cl.
*G09G 3/20* (2006.01)
*G06F 1/32* (2019.01)
(Continued)

(52) U.S. Cl.
CPC .......... *G06F 1/3231* (2013.01); *G06F 1/3265* (2013.01); *G06F 1/3287* (2013.01);
(Continued)

(58) Field of Classification Search
CPC combination set(s) only.
See application file for complete search history.

(56) References Cited

U.S. PATENT DOCUMENTS

2004/0239653 A1* 12/2004 Stuerzlinger ......... G06F 3/0386
345/183
2012/0050189 A1   3/2012 Choboter
(Continued)

FOREIGN PATENT DOCUMENTS

CN    101632067 B    10/2013
CN    102301684 B     1/2014
(Continued)

OTHER PUBLICATIONS

First Office Action in corresponding Chinese application No. 201810573861.7, dated Feb. 3, 2019.
(Continued)

*Primary Examiner* — Wesner Sajous
(74) *Attorney, Agent, or Firm* — Ladas & Parry LLP

(57) ABSTRACT

A control method for an electronic device, an electronic device and a computer-readable storage medium are provided. The electronic device includes a transparent display screen and an infrared sensor. The transparent display screen includes a display area. The infrared sensor is stacked below the display area. The infrared sensor is configured to emit infrared light and receive infrared light reflected by an object to detect a distance between the object and the electronic device. The control method includes: acquiring an ambient brightness of the electronic device when the infrared sensor is turned on; determining whether the ambient brightness is less than a preset brightness, and controlling the infrared sensor to operate at a first predetermined power in a case that the ambient brightness is less than the preset brightness. The first predetermined power is less than a rated power of the infrared sensor.

19 Claims, 7 Drawing Sheets

(51) Int. Cl.
  *H04N 5/57* (2006.01)
  *G06F 1/3231* (2019.01)
  *G06F 1/3234* (2019.01)
  *G06F 1/3287* (2019.01)
(52) U.S. Cl.
  CPC ..... *G09G 3/2003* (2013.01); *G09G 2330/021* (2013.01); *G09G 2360/144* (2013.01)

(56) References Cited

U.S. PATENT DOCUMENTS

| | | | |
|---|---|---|---|
| 2012/0084691 A1 | 4/2012 | Yun | |
| 2014/0354567 A1 | 12/2014 | Park et al. | |
| 2015/0304533 A1* | 10/2015 | Zhang | G06F 1/1626 348/14.02 |
| 2016/0357268 A1 | 12/2016 | Alameh et al. | |
| 2017/0195473 A1 | 7/2017 | Yun | |
| 2018/0013955 A1* | 1/2018 | Kim | G06F 1/1686 |

FOREIGN PATENT DOCUMENTS

| | | |
|---|---|---|
| CN | 103780746 A | 5/2014 |
| CN | 105763803 A | 7/2016 |
| CN | 105827824 A | 8/2016 |
| CN | 106652922 A | 5/2017 |
| CN | 107124484 A | 9/2017 |
| CN | 107146581 A | 9/2017 |
| CN | 107330415 A | 11/2017 |
| CN | 103558952 B | 12/2017 |
| CN | 206948392 U | 1/2018 |
| CN | 107734191 A | 2/2018 |
| CN | 107767836 A | 3/2018 |
| CN | 107948419 A | 4/2018 |
| CN | 107968883 A | 4/2018 |
| CN | 109040417 A | 12/2018 |
| EP | 2784638 A1 | 10/2014 |
| JP | 2015061313 A | 3/2015 |
| WO | 2017133260 A1 | 8/2017 |

OTHER PUBLICATIONS

International Search Report in the international application No. PCT/CN2019/089973, dated Aug. 23, 2019.
Written Opinion of the International Search Authorty in the international application No. PCT/CN2019/089973, dated Aug. 23, 2019.
European Search Report in the European application No. 19178348.9, dated Jul. 31, 2019.
First Office Action of the Indian application No. 201914022300, dated Feb. 26, 2021.
Third Office Action of the Chinese application No. 201810573861.7, dated Feb. 2, 2021.
Second Office Action of the Chinese application No. 201810573861.7, dated Aug. 19, 2020.
Decision of Refusal of the Chinese application No. 201810573861.7, dated Jul. 5, 2021.
First Office Action of the European application No. 19178348.9, dated Aug. 24, 2021.

* cited by examiner

CONTROL METHOD FOR ELECTRONIC DEVICE, ELECTRONIC DEVICE, COMPUTER-READABLE STORAGE MEDIUM

This application is filed based upon and claims priority to Chinese Patent Application No. 201810573861.7, filed on Jun. 6, 2018, the entire contents of which are incorporated herein by reference.

BACKGROUND

In a case that an infrared sensor is stacked below a display screen, electrons in the TFT substrate of the display screen are excited, and flickering of the display screen is caused due to infrared light emitted by the infrared sensor, which results in interference with the normal display of the display screen.

SUMMARY

A control method for an electronic device, an electronic device, a computer-readable storage medium are provided according to the embodiments of the disclosure.

A control method for an electronic device is provided in a first aspect of the disclosure. The electronic device includes a transparent display screen and an infrared sensor. The transparent display screen includes a display area. The infrared sensor is stacked below the display area. The infrared sensor is configured to emit infrared light and receive infrared light reflected by an object, to detect a distance between the object and the electronic device. The control method includes operations as follows.

An ambient brightness of the electronic device is acquired when the infrared sensor is turned on.

Whether the ambient brightness is less than a preset brightness is determined.

The infrared sensor is controlled to operate at a first predetermined power in a case that the ambient brightness is less than the preset brightness, to weaken interference of the infrared light emitted by the infrared sensor with the transparent display screen. The first predetermined power is less than a rated power of the infrared sensor.

An electronic device is provided in a second aspect of the disclosure. The electronic device includes a transparent display screen, an infrared sensor and a processor. The transparent display screen includes a display area. The infrared sensor is stacked below the display area. The infrared sensor is configured to emit infrared light and receive infrared light reflected by an object, to detect a distance between the object and the electronic device. The processor is configured to perform operations as follows.

An ambient brightness of the electronic device is acquired when the infrared sensor is turned on.

Whether the ambient brightness is less than a preset brightness is determined. The infrared sensor is controlled to operate at a first predetermined power in a case that the ambient brightness is less than the preset brightness, to weaken interference of the infrared light emitted by the infrared sensor with the transparent display screen. The first predetermined power is less than a rated power of the infrared sensor.

A non-volatile computer-readable storage medium including a computer-executable instruction is further provided in a third aspect of the disclosure. When being executed by one or more processors, the computer-executable instruction enables the processors to perform a control method for an electronic device. The electronic device includes a transparent display screen and an infrared sensor. The transparent display screen includes a display area. The infrared sensor is stacked below the display area. The infrared sensor is configured to emit infrared light and receive infrared light reflected by an object, to detect a distance between the object and the electronic device. The control method includes operations as follows.

An ambient brightness of the electronic device is acquired when the infrared sensor is turned on.

Whether the ambient brightness is less than a preset brightness is determined.

The infrared sensor is controlled to operate at a first predetermined power in a case that the ambient brightness is less than the preset brightness, to weaken interference of the infrared light emitted by the infrared sensor with the transparent display screen. The first predetermined power is less than a rated power of the infrared sensor.

BRIEF DESCRIPTION OF DRAWINGS

The above and/or additional aspects and advantages of the disclosure will become apparent and readily understood based on the following description for the embodiments in conjunction with the accompanying drawings, in the accompanying drawings.

DETAILED DESCRIPTION

Figure 1:
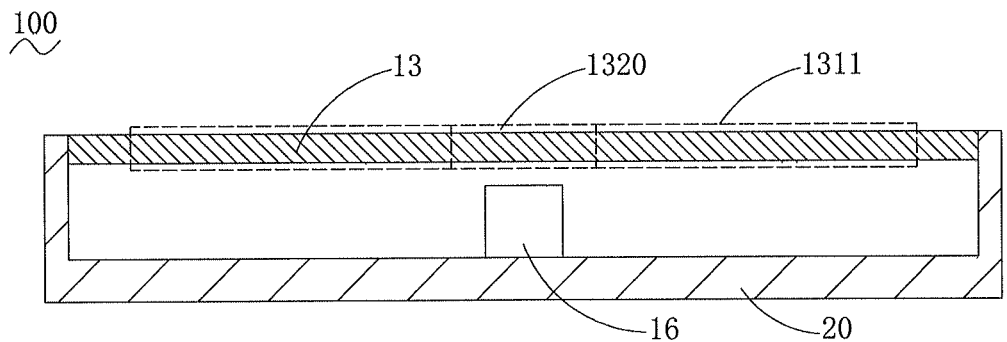
FIG. 1 is a schematic sectional view of an electronic device according to some embodiments of the disclosure.

The embodiments of the disclosure are described in detail below, and the examples of the embodiments are illustrated in the drawings, throughout which, the same or similar reference numerals denote the same or similar elements, or elements having the same or similar functions. The embodiments described below with reference to the drawings are only exemplary, and are intended to interpret the disclosure rather than limiting the disclosure.

Figure 2:
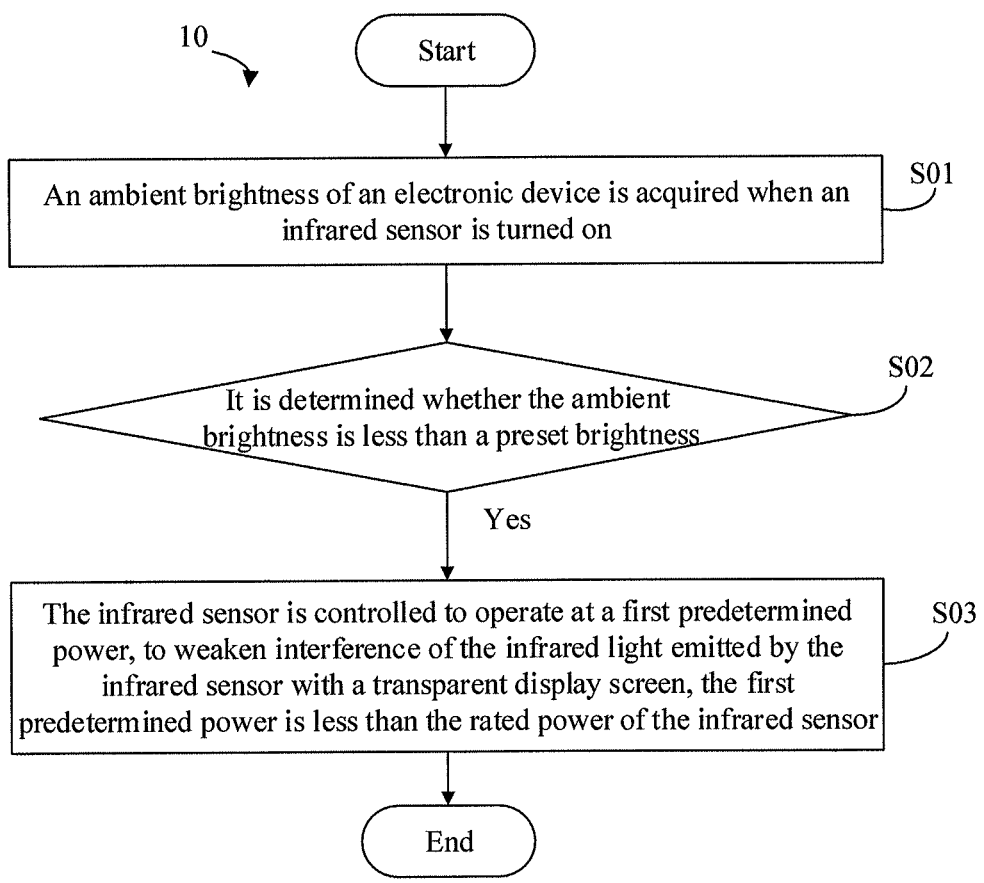
FIG. 2 is a schematic flowchart of a control method according to some embodiments of the disclosure.

Referring to FIG. 1 and FIG. 2, a control method 10 of an electronic device 100 is provided according to the disclosure. In the control method 10 for the electronic device 100, the electronic device 100 includes a transparent display screen 13 and an infrared sensor 16. The transparent display screen 13 includes a display area 1311. The infrared sensor 16 is stacked below the display area 1311. The infrared sensor 16 is configured to emit infrared light and receive infrared light reflected by an object, to detect a distance between the object and the electronic device 100. With the stacking arrangement, the infrared sensor 161 is disposed below the display screen 13 in a case that the electronic device 100 is placed horizontally. The method 10 includes the operations as follows.

At S01, an ambient brightness of the electronic device 100 is acquired when the infrared sensor 16 is turned on.

At S02, whether the ambient brightness is less than a preset brightness is determined.

At S03, the infrared sensor 16 is controlled to operate at a first predetermined power in a case that the ambient brightness is less than the preset brightness, to weaken interference of the infrared light emitted by the infrared sensor 16 with the transparent display screen 13. The first predetermined power is less than a rated power of the infrared sensor 16.

Figure 3:
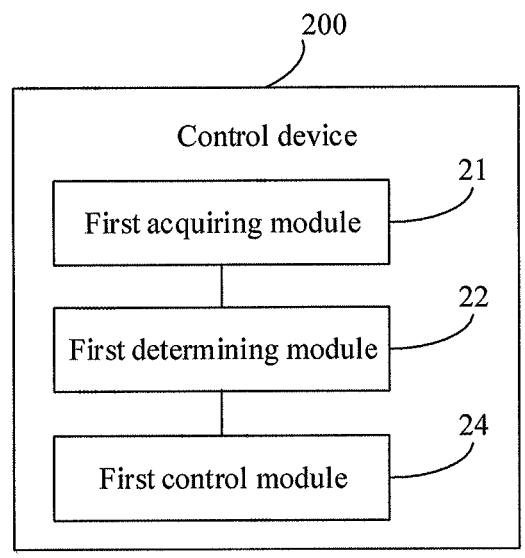
FIG. 3 is a schematic block diagram of a control device according to some embodiments of the disclosure.

Referring to FIG. 3, a control device 200 for the electronic device 100 is further provided according to an embodiment of the disclosure. The control method 10 for the electronic device 100 according to the embodiment of the disclosure may be implemented by the control device 200 for the electronic device 100 according to the embodiment of the disclosure. The control device 200 includes a first acquiring module 21, a first determining module 22 and a first control module 24. The first acquiring module 21 is configured to acquire an ambient brightness of the electronic device 100 when the infrared sensor 16 is turned on. The first determining module 22 is configured to determine whether the ambient brightness is less than a preset brightness. The first control module 24 is configured to control the infrared sensor 16 to operate at a first predetermined power in a case that the ambient brightness is less than the preset brightness, to weaken interference of the infrared light emitted by the infrared sensor 16 with the transparent display screen 13. The first predetermined power is less than a rated power of the infrared sensor 16. That is, S01 may be implemented by the first acquiring module 21, S02 may be implemented by the first determining module 22, and S03 may be implemented by the first control module 24.

Figure 5:
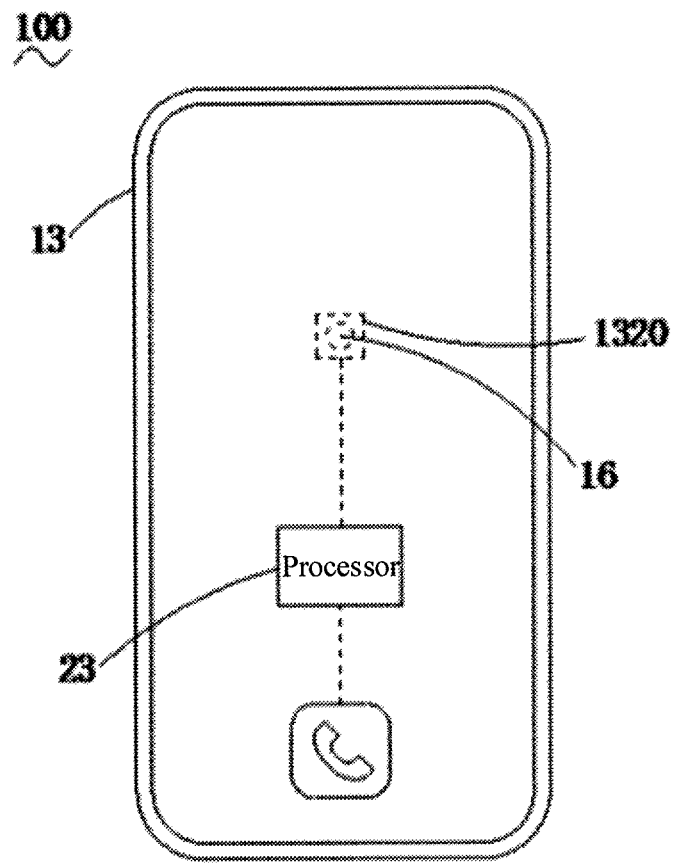
FIG. 5 is a schematic block diagram of an electronic device according to some embodiments of the disclosure.

Referring to FIG. 5, an electronic device 100 is further provided according to an embodiment of the disclosure. The electronic device 100 includes a transparent display screen 13, an infrared sensor 16 and a processor 23. The transparent display screen 13 includes a display area 1311. The infrared sensor 16 is stacked below the display area 1311. The infrared sensor 16 is configured to emit infrared light and receive infrared light reflected by an object, to detect a distance between the object and the electronic device 100. The processor 23 is configured to: acquire an ambient brightness of the electronic device 100 when the infrared sensor 16 is turned on; determine whether the ambient brightness is less than a preset brightness; and control the infrared sensor 16 to operate at a first predetermined power in a case that the ambient brightness is less than the preset brightness, to weaken interference of the infrared light emitted by the infrared sensor 16 with the transparent display screen 13. The first predetermined power is less than a rated power of the infrared sensor 16. That is, S01, S02 and S03 may be implemented by the processor 23.

A mobile phone is taken as an example of the electronic device 100 in the embodiment of the disclosure for illustration. An infrared sensor 16 is generally disposed at a top position of a screen of the mobile phone, to determine a distance between the mobile phone and an obstacle and make adjustment, thereby preventing misoperation of a user and saving power of the mobile phone. When the user answers or makes a call and therefore makes the mobile phone approach the head, the infrared sensor 16 calculates time elapsed from a time instant when an emitter emits infrared light to a time instant when reflected infrared light is received by a receiver, and generates detection information. The processor 23 transfers an instruction to a controller based on the detection information. The controller controls the transparent display screen 13 to be blanked in response to the instruction. The screen may include for example an LCD screen and an OLED screen. For the LCD screen, the controller may control a backlight of the LCD screen to be turned off in response to the instruction. For the OLED screen, the controller may control pixels not to illuminate in response to the instruction. When the mobile phone is brought away from the head, the processor 23 generates and transfers an instruction based on the detection information fed back by the infrared sensor 16, and the controller lights up the transparent display screen 13 in response to the instruction.

With the control method 10, the control device 200 and the electronic device 100 according to the embodiments of the disclosure, the infrared sensor 16 is controlled to reduce power in a dark environment, to reduce interference of the infrared light emitted by the infrared sensor 16 with the transparent display screen 13, thereby improving user experience in the dark environment.

It will be appreciated that with the development of electronic devices, bezel-less phones have become the development trend of mobile phones. Due to a high occupation proportion of the screen in the bezel-less phone, there is limited space reserved for an infrared sensor or other components at the top of the screen. In a case that the infrared sensor is stacked below a transparent display screen, electrons in the screen are excited to cause flickering of the transparent display screen due to a photoelectric effect in a process of emitting an infrared light by the infrared sensor, which interfere with the normal display of the transparent display screen and affects the user experience. In a case that the ambient brightness is less than a preset brightness, it can be indicated that the environment is dark, and the human eye is more sensitive to flickering in the dark environment. Therefore, a user is more likely to perceive a flickering phenomenon caused in a case that the infrared light emitted by the infrared sensor 16 interferes with the transparent display screen 13. In this case, the infrared sensor 16 is controlled to operate at a first predetermined power lower than a rated power, and the infrared light emitted by the infrared sensor 16 can be weakened to weaken the flickering phenomenon, thereby improving user experience in the dark environment.

The ambient brightness can be detected by a light sensor. The light sensor generates different magnitudes of currents upon receiving different light intensities, to sense ambient light brightness.

In some embodiments, the control method 10 includes operations as follows.

The infrared sensor 16 is controlled to operate at a second predetermined power in a case that the ambient brightness is greater than or equal to the preset brightness. The second predetermined power is greater than or equal to the rated power of the infrared sensor 16.

In some embodiments, the control device 200 includes a second control module. The second control module is configured to control the infrared sensor 16 to operate at a second predetermined power in a case that the ambient brightness is greater than or equal to the preset brightness. The second predetermined power is greater than or equal to the rated power of the infrared sensor 16.

In some embodiments, the processor 23 is configured to control the infrared sensor 16 to operate at a second predetermined power in a case that the ambient brightness is greater than or equal to the preset brightness. The second predetermined power is greater than or equal to the rated power of the infrared sensor 16.

In this way, the sensitivity of the infrared sensor 16 can be improved and the effect of ambient light on the infrared sensor 16 can be mitigated. It should be appreciated that the power of the infrared sensor 16 is positively correlated with the sensitivity of the infrared sensor 16. In a case that the ambient brightness is greater than or equal to the preset brightness, it can be indicated that the current environment is bright with more stray light, and there is less stimulation of the flickering onto the human eye in the bright environment. Therefore, the power can be appropriately regulated to a second predetermined power greater than or equal to the rated power, thereby improving the sensitivity of the infrared sensor 16 and reducing the interference of the ambient light while ensuring the user experience.

In some embodiments, before S01, the control method 10 includes operations as follows.

Whether the electronic device 100 performs a call service is determined.

The infrared sensor 16 is controlled to be turned on in a case that the electronic device 100 performs the call service.

In some embodiments, the control device 200 includes a second determining module and a third control module. The second determining module is configured to determine whether the electronic device 100 performs a call service. The third control module is configured to control the infrared sensor 16 to be turned on in a case that the electronic device 100 performs the call service.

In some embodiments, the processor 23 is configured to determine whether the electronic device 100 performs a call service, and controls the infrared sensor 16 to be turned on in a case that the electronic device 100 performs the call service.

In this way, the infrared sensor 16 regulates the screen to be blanked or lighted up based on a distance between the electronic device 100 and a user. In this case, the infrared sensor 16 is turned on when the user answers a call, so that the screen of the electronic device 100 is lighted up when the electronic device is brought away from the human body, and the screen of the electronic device 100 is blanked when the electronic device approaches the user, which not only prevents misoperation of the user, but also saves power of the electronic device 100. When the user answers the call, the infrared sensor 16 may be controlled to operate at the rated power. It should be appreciated that the user does not look at the transparent display screen 13 when answering the call. Therefore, the control of the infrared sensor 16 to operate at the rated power ensures normal operation of the infrared sensor 16 without greatly lowering the user experience.

The call service may be a process of voice conversation of the user. For example, the call service is a process in which the user dials a phone number and waits for the other person to answer, and may also be a process in which the user is in voice call with others.

In some embodiments, the control method 10 includes operations as follows.

The infrared sensor 16 is controlled to continuously emit infrared light in a case that the ambient brightness is less than the preset brightness.

In some embodiments, the control device 200 includes a fourth control module. The fourth control module is configured to control the infrared sensor 16 to continuously emit infrared light in a case that the ambient brightness is less than the preset brightness.

In some embodiments, the processor 23 is configured to control the infrared sensor 16 to continuously emit infrared light in a case that the ambient brightness is less than the preset brightness.

In this way, the flickering phenomenon caused by interference of the infrared light emitted from the infrared sensor 16 with the transparent display screen 13 can be weakened. Since the flickering phenomenon does not occur for the continuous infrared light, the user experience can be improved in a case that the infrared sensor 16 is controlled to continuously emit the infrared light if the ambient brightness is less than the preset brightness.

In some embodiments, the first predetermined power is 50% to 80% of the rated power.

In this way, normal operation of the infrared sensor 16 can be ensured while the user experience is improved by reducing the power of the infrared sensor 16. It should be appreciated that in a case that the ratio of the first predetermined power to the rated power is less than 50%, since the power of the infrared sensor 16 is too low, the infrared sensor 16 cannot operate normally, and the infrared sensor 16 has a weak ability of emitting infrared rays. It is unable to emit the infrared rays to the surface of an object or reflect the infrared rays back from the surface of the object. In a case that the ratio of the first predetermined power to the rated power is greater than 80%, since the power of the infrared sensor 16 is too high, the flickering phenomenon is not weakened effectively, and the user experience cannot be improved. In a case that the first predetermined power is 50% to 80% of the rated power, the normal operation of the infrared sensor 16 is ensured while improving the user experience, and thus the comprehensive level of the electronic device 100 can be improved.

In one example, the infrared sensor 16 has a rated power of 5 mW and the infrared sensor 16 has a predetermined power of 3 mW.

In some embodiments, the display area 1311 includes a window area 1320. The infrared sensor 16 is stacked below the window area 1320. After S03, the control method further includes operations as follows.

The window area 1320 is controlled to display a predetermined color. The predetermined color includes black.

In some embodiments, the display area 1311 includes a window area 1320. The infrared sensor 16 is stacked below the window area 1320. The control device further includes a fifth control module. The fifth control module is configured to control the window area 1320 to display predetermined color. The predetermined color includes black.

In some embodiments, the processor 23 is configured to control the window area 1320 to display a predetermined color. The predetermined color includes black.

In this way, it may be difficult for the user to visually observe the flickering phenomenon caused by the interference between the infrared light emitted by the infrared sensor 16 and the transparent display screen 13, thereby further improving the user experience. An orthographic projection of the infrared sensor 16 on the transparent display screen 13 may overlap the window area 1320. In practical, the orthographic projection of the infrared sensor 16 on the transparent display screen 13 may fall within the edges of the window area 1320.

In some embodiments, after S03, the control method 10 includes operations as follows.

Whether a distance between an object and the electronic device 100 is less than a predetermined distance is determined.

The transparent display screen 13 is controlled to be blanked in a case that the distance between the object and the electronic device 100 is less than the predetermined distance.

In some embodiments, the control device 200 includes a third determining module and a sixth control module. The third determining module is configured to determine whether a distance between an object and the electronic device 100 is less than a predetermined distance. The sixth control module is configured to control the transparent display screen 13 to be blanked in a case that the distance between the object and the electronic device 100 is less than the predetermined distance.

In some embodiments, the processor 23 is configured to determine whether a distance between an object and the electronic device 100 is less than a predetermined distance, and control the transparent display screen 13 to be blanked in a case that the distance between the object and the electronic device 100 is less than the predetermined distance.

The screen is controlled to be blanked by the infrared sensor 16, since a target of the infrared sensor 16 is apparent, a response time of the user can be shortened, thereby protecting privacy. In general, when there is an incoming call at an electronic device such as a mobile phone, the electronic device usually lights up the screen to display information of a caller. For example, the electronic device displays the name and number of the caller. The user often needs to touch the transparent display screen of the electronic device or press a physical button of the electronic device to answer the call or hang up the call, which may take a long time for operation and thus easily leak information of the caller displayed on the electronic device. With the control method 10 and the control device 200 according to the embodiments of the disclosure, the transparent display screen 13 is controlled to be blanked in combination with a current posture of the electronic device 100 and the distance detected by the infrared sensor 16, so that the user can make the screen be blanked within a short time in a specific scene, thereby protecting the privacy of the caller.

It should be noted that the "incoming call" here may refer to a call made by the caller to the user, or a voice call or a video call initiated by the caller to the user through social software, and may also refer to a message sent by the caller to the user. The type of the incoming call is not limited here. In addition, a call application may also be an application that may invoke a call function during use, such as an instant messaging application. The embodiments of the disclosure are only intended to interpret the disclosure rather than limiting the disclosure.

Figure 4:
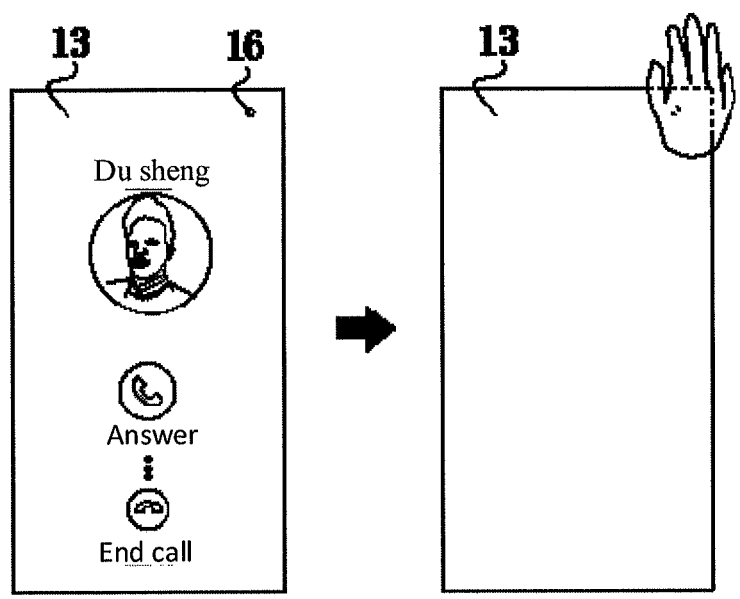
FIG. 4 is a schematic scene view of a control method according to some embodiments of the disclosure.

Referring to FIG. 4, in one example, when a user is in a meeting, a screen of a mobile phone is lighted up due to an incoming call. Because the screen is suddenly lighted up, it is easy for person to subconsciously shift the line of sight, and the mobile phone is placed flat on a conference table, the surrounding person can easily see the content displayed on the screen, which results in leakage of privacy of the caller. Since it will take a time period for searching for a small icon on the transparent display screen 13 or searching for a small physical key on the mobile phone to touch the transparent display screen 13 or pressing the physical key of the mobile phone, and the infrared sensor 16 may sense within a large range, the screen can be blanked by the infrared sensor 16 as long as the user reaches for the phone or takes something to block the phone. In this way, the screen can be blanked by the infrared sensor 16 within a shorter time, thereby protecting the privacy.

In some embodiments, the operation of controlling the transparent display screen 13 to be blanked in a case that the distance between the object and the electronic device 100 is less than the predetermined distance includes operations as follows.

The electronic device 100 is controlled to hang up an incoming call.

In some embodiments, the control device 200 includes a first control unit, configured to control the electronic device 100 to hang up an incoming call.

In some embodiments, the processor 23 is configured to control the electronic device 100 to hang up an incoming call.

In this way, the incoming call is hung up while the transparent display screen 13 is controlled to be blanked, the power of the electronic device 100 can be saved. It should be appreciated that although the transparent display screen 13 is controlled to be blanked, if the incoming call is not hung up, the electronic device 100 may continue consuming a large amount of power due to the persistency of the to-be-answered state, and even the caller may dial the number again because the call is not answered. Therefore, in a case that the electronic device 100 is controlled to hang up the incoming call, the caller is informed directly that it is inconvenient to answer the call now while saving power. In practical, S04 may further include that: the electronic device 100 is controlled to hang up the incoming call and preset information is sent to the caller, to inform the caller that it is inconvenient to answer the call now.

A computer-readable storage medium is further provided according to an embodiment of the disclosure. The non-volatile computer-readable storage medium include a computer-executable instruction. The computer-executable instruction enables one or more processors 23 to perform the control method according to any one of the above embodiments when being executed by the one or more processors 23.

Figure 6:
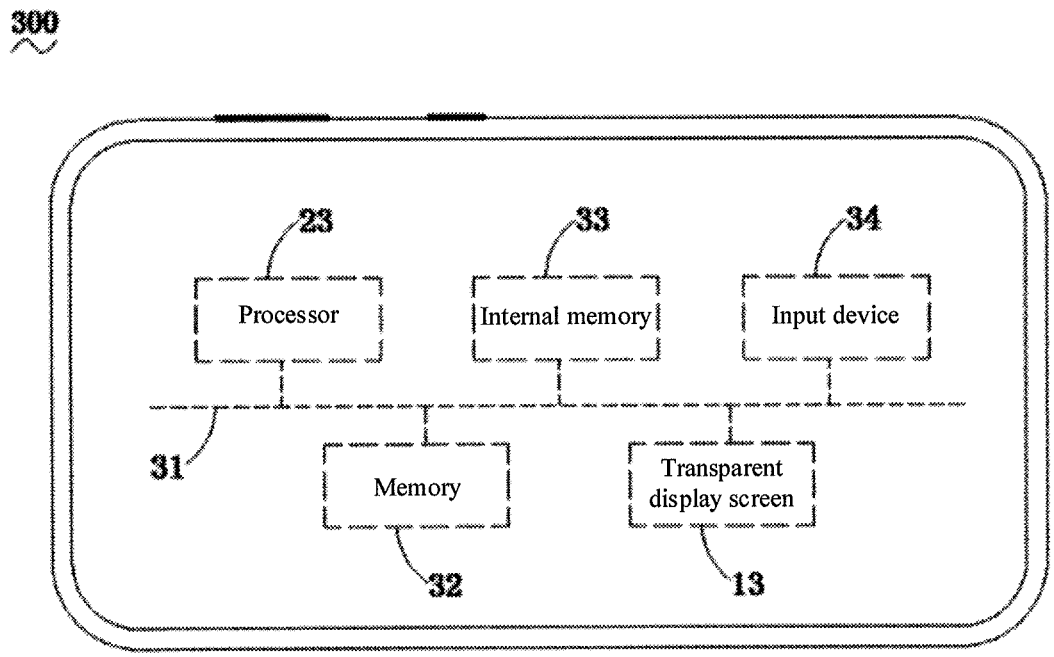
FIG. 6 is a schematic block diagram of a computer device according to some embodiments of the disclosure.

Referring to FIG. 6, a computer device 300 is further provided according to an embodiment of the disclosure. The computer device includes a memory 32 and a processor 23. A computer-readable instruction is stored in the memory 32. The instruction enables the processor 23 to perform the control method according to any one of the above embodiments when being executed by the processor 23.

FIG. 6 is a schematic diagram showing an internal module of a computer device 300 according to an embodiment. The computer device 300 includes a processor 23, a memory 32 (e.g., a non-volatile storage medium), an internal memory 33, a transparent display screen 13 and an input device 34 that are connected by a system bus 31. The memory 32 of the computer device 300 stores an operating system and a computer-readable instruction. The computer-readable instruction can implement the control method 10 according to any one of the above embodiments when being executed by the processor 23. The processor 23 may be configured to provide computing and control capabilities for supporting the operation of the entire computer device 300. The internal memory 33 of the computer device 300 provides an environment for operating the computer-readable instruction in the memory 32. The transparent display screen 13 of the computer device 300 may be an OLED transparent display screen, a Micro LED transparent display screen or the like. The input device 34 may be a touch panel covering the transparent display screen 13, or may be a button, a trackball or a trackpad disposed on a housing of the computer device 300, or may also be an external keyboard, trackpad or mouse. The computer device 300 may be a mobile phone, a tablet, a laptop, a personal digital assistant or a wearable device (such as a smart bracelet, a smart watch, a smart helmet, or smart glasses). Those skilled in the art may understand that the structure shown in FIG. 6 is only schematic diagram for a partial structure associated with the solution of the disclosure, and is not intended to limit the computer device 300 to which the solution of the disclosure is applied. The computer device 300 may include more or fewer parts than those shown in FIG. 6, or combine some parts, or have different part arrangements.

In some embodiments, the transparent display screen 13 includes an OLED transparent display screen.

The OLED transparent display screen has good light transmittance, and visible light and infrared light can be transmitted through the OLED transparent display screen. Therefore, the OLED transparent display screen may not affect emitting and receiving infrared light by the infrared sensor 16 while displaying the content. The transparent display screen 13 may also be a Micro LED transparent display screen, and the Micro LED transparent display screen also has good light transmittance for visible light and infrared light. In practical, these transparent display screens are merely exemplary, and the embodiments of the disclosure are not limited thereto.

Figure 7:
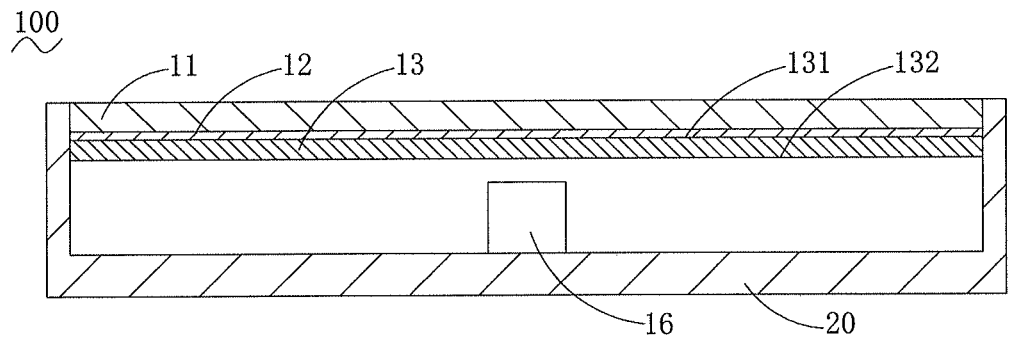
FIG. 7 to FIG. 16 are schematic sectional views of an electronic device according to some embodiments of the disclosure.

Referring to FIG. 7, in some embodiments, the electronic device 100 further includes a transparent cover plate 11 and a transparent touch panel 12. The transparent cover plate 11 is formed on the transparent touch panel 12. The transparent touch panel 12 is disposed on the transparent display screen 13. An upper surface 131 of the transparent display screen 13 faces the transparent touch panel 12. The transparent cover plate 11 and the transparent touch panel 12 have light transmittance of more than 90% for visible light and infrared light.

The transparent touch panel 12 is configured to receive an input signal generated when the user touches the transparent touch panel 12 and transmit the input signal to a circuit board for data processing, to obtain a position where the user touches the transparent touch panel 12. In-Cell or On-Cell bonding technology may be used to bond the transparent touch panel 12 to the transparent display screen 13, to effectively reduce the weight of the transparent display screen 13 and reduce the overall thickness of the transparent display screen 13. In addition, the transparent cover plate 11 is disposed on the transparent touch panel 12, which can effectively protect the transparent touch panel 12 and an internal structure thereof, and therefore avoid damage of an external force on the transparent touch panel 12 and the transparent display screen 13. The transparent cover plate 11 and the transparent touch panel 12 have light transmittance of more than 90% for visible light and infrared light, which not only facilitates displaying content by the transparent display screen 13, but also facilitates stable emitting and receiving infrared light by the infrared sensor 16 stacked below the transparent display screen 13, thereby ensuring the normal operation of the infrared sensor 16.

Figure 8:
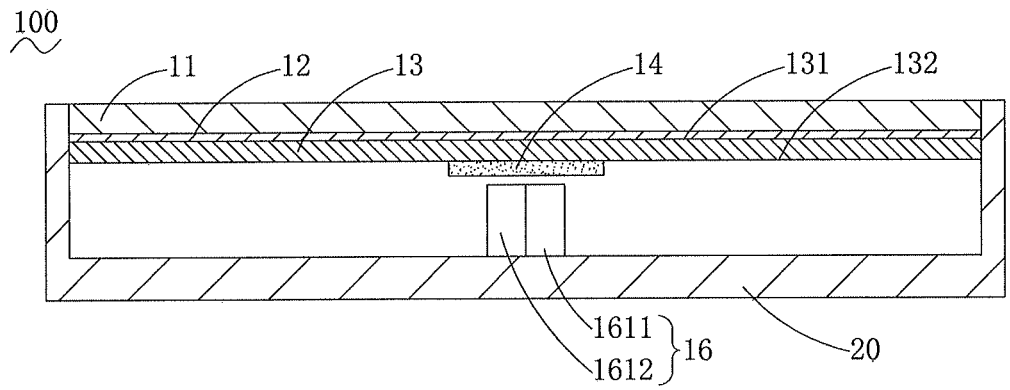

Referring to FIG. 8, in some embodiments, the transparent display screen 13 includes an upper surface 131 and a lower surface 132. The electronic device 100 further includes a first coating layer 14 coated on the lower surface 132 and covering the infrared sensor 16. The first coating layer is disposed to allow infrared light to be transmitted and visible light to be blocked. The infrared sensor 16 is configured to emit and/or receive the infrared light through the first coating layer 14 and the transparent display screen 13.

The first coating layer 14 is disposed to allow the infrared light to be transmitted to ensure the normal operation of the infrared sensor 16, and the first coating layer 14 is disposed to allow the visible light to be blocked, to realize an effect that the infrared sensor 16 is invisible when the electronic device 100 is viewed from the outside.

In some embodiments, the infrared sensor 16 includes a proximity sensor including an emitter 1611 and a receiver 1612. The emitter 1611 is configured to emit infrared light through the first coating layer 14 and the transparent display screen 13. The receiver 1612 is configured to receive infrared light emitted by an object to detect a distance between the object and the electronic device 100.

When a user answers or makes a call, the electronic device 100 approaches the head, the emitter 1611 emits an infrared light, the receiver 1612 receives the reflected infrared light, and the processor 23 calculates time elapsed from a time instant when the infrared light is emitted to a time instant when reflected infrared light is received, and transmits an instruction to control the backlight of the screen to be turned off. When the electronic device 100 is brought away from the head, the processor 23 performs calculation based on the feedback data and transmits an instruction to turn on the backlight of the screen. In this way, not only misoperation of the user is prevented, but also power of the mobile phone is saved.

In some embodiments, an orthographic projection of the infrared sensor 16 on the lower surface 132 is within an orthographic projection of the first coating layer 14 on the lower surface 132.

An assembly clearance should be reserved during process assembly for installing the infrared sensor 16, resulting in a gap between the infrared sensor 16 and other components. Therefore, visible light enters the gap, causing a light leakage phenomenon. Therefore, in a direction where the infrared sensor 16 and the transparent display screen 13 are stacked, the area of the orthographic projection of the first coating layer 14 on the lower surface 132 is larger than the area of the orthographic projection of the infrared sensor 16 on the lower surface 132. In this way, the first coating layer 14 can fully cover the infrared sensor 16 without affecting the normal operation of the infrared sensor 16, so that the infrared sensor 16 is invisible when the electronic device 100 is viewed from the outside.

Figure 9:
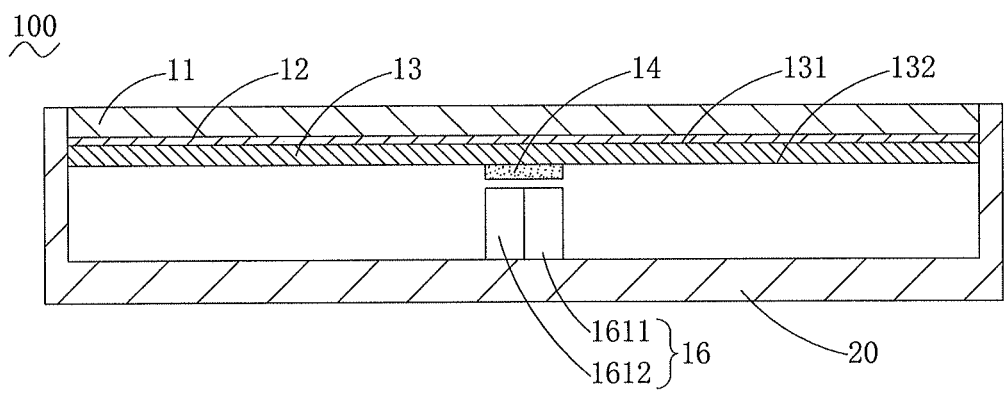

Referring to FIG. 9, in some embodiments, the orthographic projection of the infrared sensor 16 on the lower surface 132 overlaps the first coating layer 14.

In the direction where the infrared sensor 16 and the transparent display screen 13 are stacked, the area of the orthographic projection the first coating layer 14 on the lower surface 132 may be equal to the area of the orthographic projection of the infrared sensor 16 on the lower surface 132. In this way, the first coating layer 14 can exactly cover the infrared sensor 16 without affecting the normal operation of the infrared sensor 16, so that the infrared sensor 16 is invisible when the electronic device 100 is viewed from a direction toward and perpendicular to the upper surface 131 of the transparent display screen 13.

Figure 10:
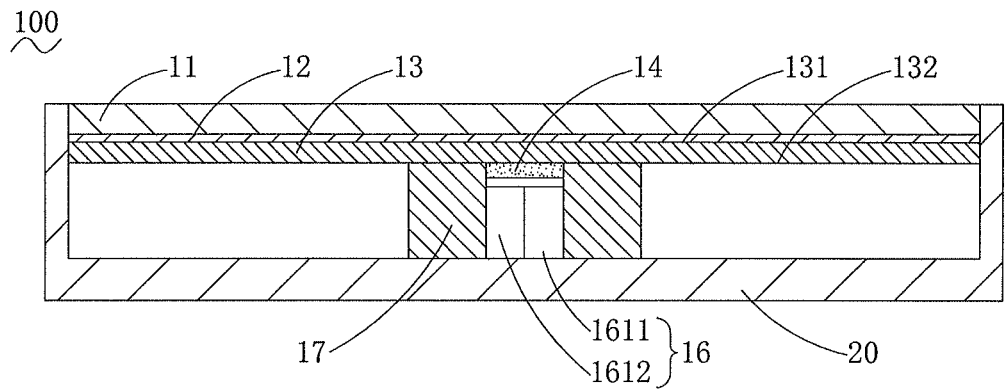

Referring to FIG. 10, further, in such an embodiment, the electronic device 100 further includes a light shielding layer 17 disposed on the lower surface 132 and surrounding the infrared sensor 16.

In a case that the area of the orthographic projection of the first coating layer 14 on the lower surface 132 is set to be equal to the area of the orthographic projection of the infrared sensor 16 on the lower surface 132, since the volume of the space in which the infrared sensor 16 is placed is larger than the volume of the infrared sensor 16, a light leakage phenomenon occurs in space surrounding the infrared sensor 16 when the electronic device 100 is viewed from the external environment. Therefore, the gap between the infrared sensor 16 and the surrounding space is filled with the light shielding layer 17 disposed around the infrared sensor 16, which can eliminate the light leakage phenomenon. The light shielding layer 17 may be foam made of a black material, or may be other black foamed plastics or rubber. In practical, these materials are merely exemplary, and the embodiments of the disclosure are not limited thereto.

In some embodiments, the infrared sensor 16 includes a proximity sensor including an emitter 1611 and a receiver 1612. The emitter 1611 is configured to emit infrared light through the first coating layer 14 and the transparent display screen 13. The receiver 1612 is configured to receive infrared light reflected by an object to detect a distance between the object and the electronic device 100.

When a user answers or makes a call, the electronic device 100 approaches the head, the emitter 1611 emits infrared light, the receiver 1612 receives the reflected infrared light, and the processor 23 calculates the time elapsed from a time instant when the infrared light is emitted to a time instant when the reflected infrared light is received, and transmits an instruction to control the screen to turn off the backlight. When the electronic device 100 is brought away from the head, the processor 23 performs calculation based on the feedback data and transmits an instruction to turn on the backlight of the screen. In this way, not only misoperation of the user is prevented, but also power of the mobile phone is saved.

In some embodiments, the first coating layer includes IR ink, the IR ink has transmittance of greater than 85% for infrared light, and the IR ink has transmittance of less than 6% for visible light. The infrared light which can transmitted through the IR ink has a wavelength ranging from 850 nm to 940 nm.

Since the IR ink has a characteristic of low transmittance for the visible light, when the electronic device 100 is viewed from the outside, the infrared sensor 16 disposed under the first coating layer 14 is not visually observed by the human eye. Moreover, since the IR ink has the characteristics of high transmittance for the infrared light, the infrared sensor 16 can stably emit and receive the infrared light, thereby ensuring the normal operation of the infrared sensor 16.

Figure 11:
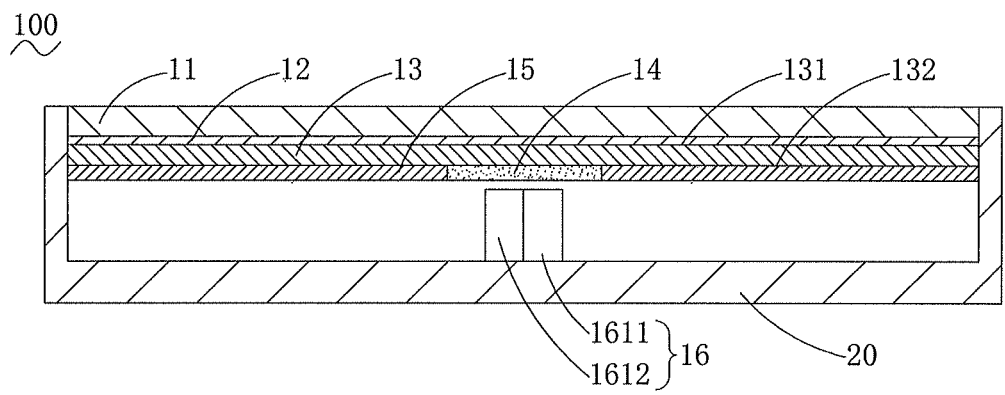
Figure 12:
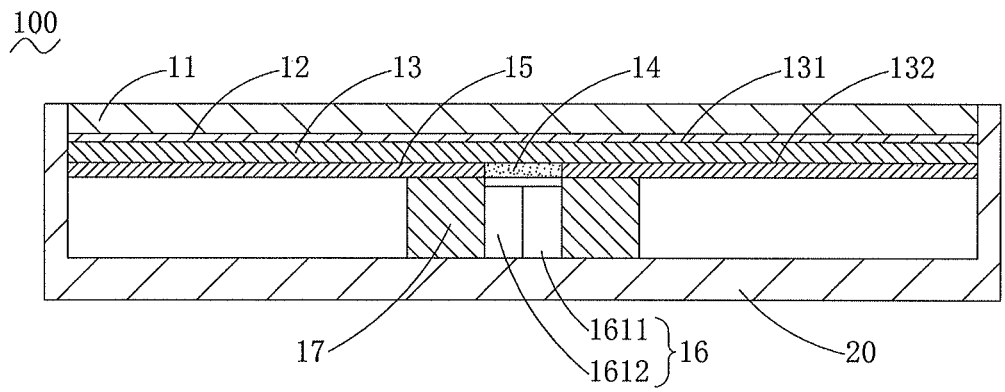

Referring to FIG. 11 and FIG. 12, in some embodiments, the electronic device 100 further includes a second coating layer 15 coated on the lower surface 132 and connected to the first coating layer 14.

The first coating layer 14 is arranged to allow infrared light to be transmitted and the infrared sensor 16 to be blocked. Since the cost of the IR ink used by the first coating layer 14 is higher than that of the ordinary black ink, if the lower surface 132 is entirely coated with the IR ink, this does not facilitate reducing the production cost. Also, the ordinary black ink has lower transmittance for the visible light than the IR ink, and thus has a better shielding effect. Therefore, arrangement of the second coating layer 15 can not only facilitate reducing the production cost, but also gain a shielding effect which better conforms to the process requirements.

Figure 13:
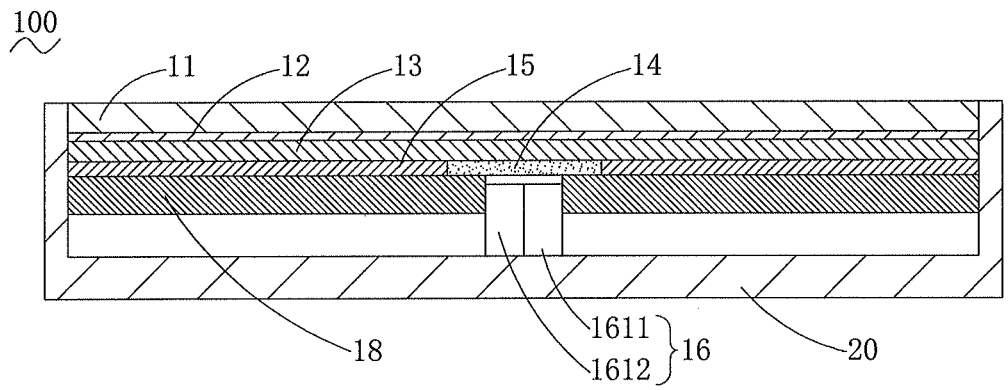
Figure 14:
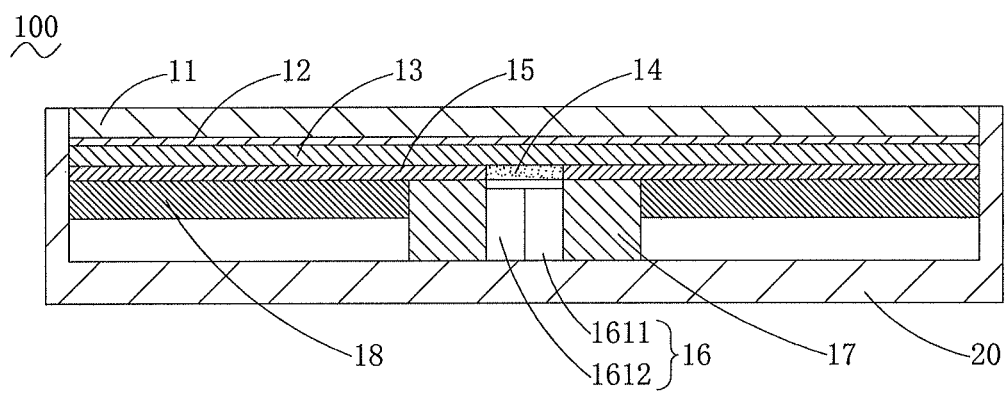

Referring to FIG. 13 and FIG. 14, in some embodiments, the electronic device 100 further includes a buffer layer 18 covering the lower surface 132 and avoiding the infrared sensor 16.

The buffer layer 18 is shockproof for mitigating an impact force, to protect the transparent touch panel 12 and the transparent display screen 13 and the internal structure thereof, thereby preventing the transparent display screen 13 from being damaged by an external impact. The buffer layer 18 may be made of foam, foamed plastics or rubber, or other soft materials. In practical, these buffer materials are merely exemplary, and the embodiments of the disclosure are not limited thereto. Furthermore, the infrared sensor 16 is avoided during the arrangement of the buffer layer 18, to prevent the buffer layer 18 from shielding the infrared sensor 16, and further prevent emitting and receiving infrared light by the infrared sensor 16 from being affected.

Figure 15:
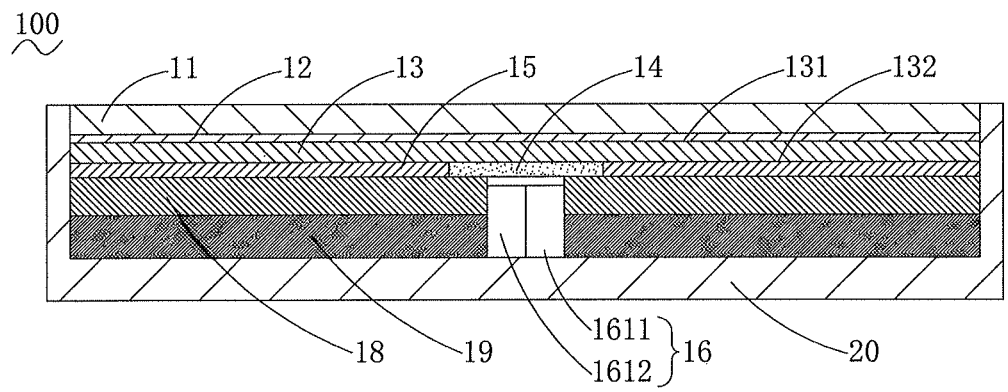
Figure 16:
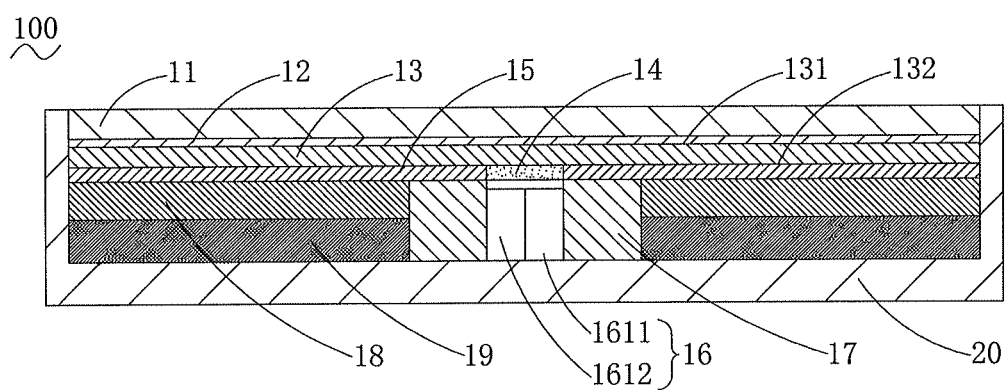

Referring to FIG. 15 and FIG. 16, further, in such an embodiment, the electronic device 100 further includes a metal sheet 19 covering the buffer layer 18 and avoiding the infrared sensor 16.

The metal sheet 19 is configured for shielding electromagnetic interference and grounding, and has a function of temperature diffusion. The metal sheet 19 may be obtained by cutting a metal material such as copper foil or aluminum foil. In practical, these metal materials are merely exemplary, and the embodiments of the disclosure are not limited thereto. Furthermore, the infrared sensor 16 is avoided during the arrangement of the metal sheet 19, to prevent the infrared sensor 16 from being shielded by the metal sheet 19, and further prevent emitting and receiving infrared light by the infrared sensor 16 from being affected.

Those skill in the art can understand that all or a part of the flows in the above method embodiments may be implemented by instructing hardware through a computer program, and the program may be stored in a non-volatile computer-readable storage medium. The program may include the flows in each of the above method embodiments when being executed. The storage medium may be a magnetic disk, an optical disk, a Read-Only Memory (ROM), or the like.

Multiple implementations of the present disclosure are disclosed in the above embodiments, which are described in detail specifically, but cannot be interpreted as limitation to the scope of the present disclosure. It should be noted that several variations and improvements can be made by those skilled in the art without departing from the concept of the present disclosure. These variations and improvements fall within the protection scope of the present disclosure. Therefore, the protection scope of the present disclosure should conform to the appended claims.

The invention claimed is:

1. A control method for an electronic device, wherein the electronic device comprises a transparent display screen and an infrared sensor, the transparent display screen comprises a display area, the infrared sensor is stacked below the display area, the infrared sensor is configured to emit infrared light and receive infrared light reflected by an object, to detect a distance between the object and the electronic device, the control method comprises:
   acquiring an ambient brightness of the electronic device when the infrared sensor is turned on;
   determining whether the ambient brightness is less than a preset brightness; and
   controlling the infrared sensor to operate at a first predetermined power in a case that the ambient brightness is less than the preset brightness, with the first predetermined power being less than a rated power of the infrared sensor,
   wherein the transparent display screen comprises an upper surface and a lower surface opposite to the upper surface, the electronic device further comprises a first coating layer coated on the lower surface and covering the infrared sensor, the first coating layer allows the infrared light to be transmitted and visible light to be blocked, and wherein the method further comprises:
controlling the infrared sensor to emit and/or receive the infrared light through the first coating layer and the transparent display screen.

2. The control method for the electronic device according to claim 1, further comprising:
controlling the infrared sensor to operate at a second predetermined power in a case that the ambient brightness is greater than or equal to the preset brightness, with the second predetermined power being greater than or equal to the rated power of the infrared sensor.

3. The control method for the electronic device according to claim 1, before the acquiring the ambient brightness of the electronic device when the infrared sensor is turned on, further comprising:
determining whether the electronic device performs a call service; and
controlling the infrared sensor to be turned on in a case that the electronic device performs the call service.

4. The control method for the electronic device according to claim 1, further comprising:
controlling the infrared sensor to continuously emit the infrared light in a case that the ambient brightness is less than the preset brightness.

5. The control method for the electronic device according to claim 1, wherein the first predetermined power is 50% to 80% of the rated power.

6. The control method for the electronic device according to claim 1, wherein the display area comprises a window area, the infrared sensor is stacked below the window area, and after the controlling the infrared sensor to operate at the first predetermined power, the control method further comprises:
controlling the window area to display a predetermined color, with the predetermined color comprising black.

7. The control method for the electronic device according to claim 1, after the controlling the infrared sensor to operate at the first predetermined power, the control method further comprising:
determining whether the distance between the object and the electronic device is less than a predetermined distance; and
controlling the transparent display screen to be blanked in a case that the distance between the object and the electronic device is less than the predetermined distance.

8. The control method for the electronic device according to claim 7, wherein the controlling the transparent display screen to be blanked comprises:
controlling the electronic device to hang up an incoming call.

9. An electronic device, comprising a transparent display screen, an infrared sensor and a processor, wherein the transparent display screen comprises a display area, the infrared sensor is stacked below the display area, the infrared sensor is configured to emit infrared light and receive infrared light reflected by an object, to detect a distance between the object and the electronic device, the processor is configured to:
acquire an ambient brightness of the electronic device when the infrared sensor is turned on;
determine whether the ambient brightness is less than a preset brightness; and
control the infrared sensor to operate at a first predetermined power when the ambient brightness is less than the preset brightness, with the first predetermined power being less than a rated power of the infrared sensor,
wherein the transparent display screen comprises an upper surface and a lower surface opposite to the upper surface, the electronic device further comprises a first coating layer coated on the lower surface and covering the infrared sensor, the first coating layer is used for allowing the infrared light to be transmitted and visible light to be blocked, and the infrared sensor is configured to emit and/or receive the infrared light through the first coating layer and the transparent display screen.

10. The electronic device according to claim 9, wherein the processor is configured to:
control the infrared sensor to operate at a second predetermined power in a case that the ambient brightness is greater than or equal to the preset brightness, with the second predetermined power being less than the rated power of the infrared sensor.

11. The electronic device according to claim 9, wherein the processor is configured to: before acquiring the ambient brightness of the electronic device when the infrared sensor is turned on,
determine whether the electronic device performs a call service; and
control the infrared sensor to be turned on in a case that the electronic device performs the call service.

12. The electronic device according to claim 9, wherein the processor is configured to:
control the infrared sensor to continuously emit the infrared light in a case that the ambient brightness is less than the preset brightness.

13. The electronic device according to claim 9, wherein the display area comprises a window area, the infrared sensor is stacked below the window area, and the processor is configured to, after the controlling the infrared sensor to operate at the first predetermined power,
control the window area to display a predetermined color, with the predetermined color comprising black.

14. The electronic device according to claim 9, wherein the processor is configured to: after the controlling the infrared sensor to operate at the first predetermined power,
determine whether the distance between the object and the electronic device is less than a predetermined distance; and
control the transparent display screen to be blanked in a case that the distance between the object and the electronic device is less than the predetermined distance.

15. The electronic device according to claim 14, wherein the processor is configured to:
control the electronic device to hang up an incoming call.

16. The electronic device according to claim 9, wherein the infrared sensor comprises a proximity sensor, the proximity sensor comprises an emitter and a receiver, the emitter is configured to emit the infrared light through the first coating layer and the transparent display screen, and the receiver is configured to receive the infrared light reflected by the object, to detect the distance between the object and the electronic device.

17. A non transitory computer-readable storage medium comprising a computer-executable instruction, wherein the computer-executable instruction, when being executed by at least one processor, enables the processor to perform a control method for an electronic device, the electronic device comprises a transparent display screen and an infrared sensor, the transparent display screen comprises a display area, the infrared sensor is stacked below the display area, the infrared sensor is configured to emit infrared light and receive infrared light reflected by an object, to detect a distance between the object and the electronic device, the control method comprises:

acquiring an ambient brightness of the electronic device when the infrared sensor is turned on;

determining whether the ambient brightness is less than a preset brightness; and controlling the infrared sensor to operate at a first predetermined power in a case that the ambient brightness is less than the preset brightness, with the first predetermined power being less than a rated power of the infrared sensor, wherein the transparent display screen comprises an upper surface and a lower surface opposite to the upper surface, the electronic device further comprises a first coating layer coated on the lower surface and covering the infrared sensor, the first coating layer allows the infrared light to be transmitted and visible light to be blocked, and wherein the method further comprises:

controlling the infrared sensor to emit and/or receive the infrared light through the first coating layer and the transparent display screen.

18. The computer-readable storage medium according to claim 17, wherein the control method further comprises:

controlling the infrared sensor to operate at a second predetermined power in a case that the ambient brightness is greater than or equal to the preset brightness, with the second predetermined power being greater than or equal to the rated power of the infrared sensor.

19. The computer-readable storage medium according to claim 17, wherein before the acquiring the ambient brightness of the electronic device when the infrared sensor is turned on, the control method further comprises:

determining whether the electronic device performs a call service; and controlling the infrared sensor to be turned on in a case that the electronic device performs the call service.

* * * * *